May 5, 1931.  E. R. MORTON  1,804,178
REGULATOR SYSTEM
Filed Feb. 19, 1929
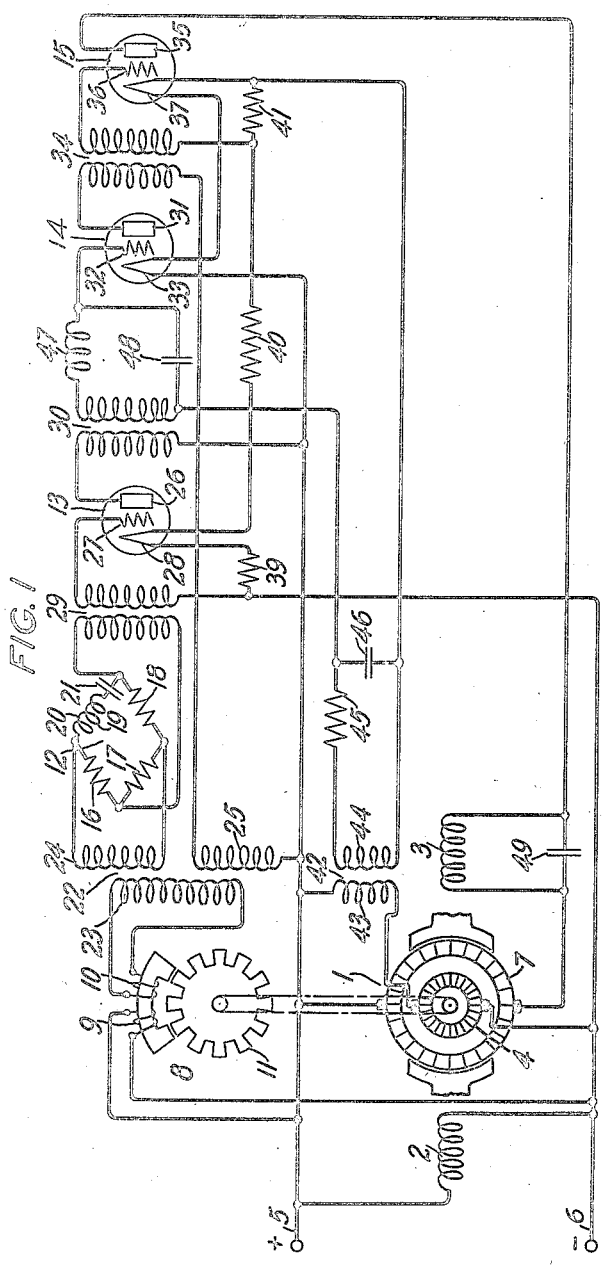
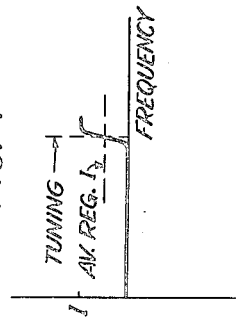
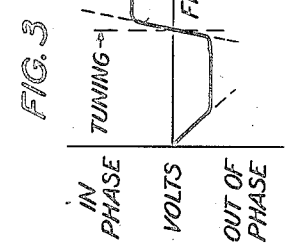
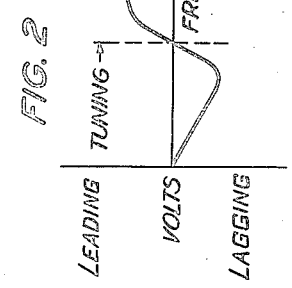
INVENTOR
E. R. Morton
BY
Wayne B Wells
ATTORNEY Patented May 5, 1931

1,804,178

UNITED STATES PATENT OFFICE

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR SYSTEM

Application filed February 19, 1929. Serial No. 341,229.

This invention relates to regulator systems for dynamo-electric machines and particularly to speed regulator systems for motors.

One object of the invention is to provide a regulator system for maintaining a characteristic of a dynamo-electric machine constant that shall prevent hunting by improved means controlled in accordance with changes in the machine current.

Another object of the invention is to provide a motor speed regulator system that shall prevent hunting action under the control of the variation in the armature current of the motor.

A further object of the invention is to provide a motor speed regulator system that shall include a phase detector thermionic tube for governing the motor excitation to maintain the motor speed constant and that shall impress a potential on the grid of the phase detector tube according to variations in the armature current to prevent hunting action.

In regulator systems which are very sensitive to any change in the characteristic being controlled, trouble is often experienced in effecting a regulating operation without the so-called hunting action. The regulator system disclosed hereinafter is very sensitive and is provided with improved means for insuring against hunting action so that regulation with a high degree of precision may be obtained.

The regulator system shown on the drawing is an improvement on the regulator systems disclosed in the patent to H. M. Stoller No. 1,695,035, dated December 11, 1928 and the patent to H. M. Stoller and E. R. Morton No. 1,719,491, dated July 2, 1929. The invention is illustrated in the drawing by a system for maintaining the speed of a direct current motor constant. The motor operates a small pilot generator which produces an alternating current having a frequency varying according to the speed of the motor. The pilot generator is connected to a Wheatstone bridge circuit having one arm in the form of a tuned circuit. The tuned arm of the bridge circuit is tuned to the frequency of the generator current when the motor is operating at normal speed. The bridge circuit is connected to a phase detector tube by means of an amplifier tube. Plate current for the phase detector tube is supplied by the alternating current pilot generator operated by the motor. Inasmuch as the current from the bridge circuit varies in phase according to the frequency of the pilot generator current and the motor speed the output current from the phase detector tube varies according to the motor speed. The phase detector tube is connected to a regulating field winding of the motor by means of a detector tube to control the motor speed.

In order to stabilize the operation of the regulator system and prevent hunting action a potential from the armature circuit is impressed on the grid of the phase detector tube. The grid of the phase detector tube is connected to the motor armature circuit by a transformer so that the potential impressed on the phase detector grid varies according to rate of change of the motor armature current. Thus the phase detector tube anticipates the operation to be effected in the regulator system and controls the regulating operation to prevent hunting action.

In the accompanying drawing, Figure 1 is a diagrammatic view of a regulator system constructed in accordance with the invention;

Figs. 2, 3 and 4 show characteristic curves for aiding in describing the operation of the regulator system.

Referring to Fig. 1 of the drawing, a motor 1 comprising a shunt field winding 2, a regulating field winding 3 and an armature 4 having a winding connected across a supply circuit comprising conductors 5 and 6. The armature 4 is provided with a high voltage winding which is connected to a commutator 7. An alternating-current generator 8 of the inductor type is operated directly by the motor 1 in order to produce a current having a frequency which varies in accordance with the motor speed. The alternating-current generator 8 comprises a field winding 9 which is connected across the supply conductors 5 and 6, an armature winding 10 and a rotor 11.

The alternating-current generator 8 controls a Wheatstone bridge 12, a thermionic amplifier tube 13, a phase detector tube 14 and a detector tube 15 for governing the excitation of the regulating field winding 3 to maintain the speed of the motor 1 substantially constant. The Wheatstone bridge circuit 12 has three resistance arms, 16, 17 and 18 and an arm 19 which is tuned to the frequency of the current supplied by the generator 8 when the motor is operating at normal speed. The tuned circuit arm 19 is composed of an inductance element 20 and capacity element 21. A transformer 22 having a primary winding 23 and two secondary windings 24 and 25 is provided for connecting the Wheatstone bridge circuit to the generator armature winding. The primary winding 23 is connected to the armature winding 10 of the generator and the secondary winding 24 is connected to two opposite vertices of the Wheatstone bridge circuit. The secondary winding 25 is provided for supplying alternating plate potential to the phase detector tube 14.

The thermionic amplifier tube 13 comprises an anode 26, a grid element 27 and a cathode 28. The input circuit of the thermionic amplifier tube 13 is coupled by a transformer 29 to the vertices of the Wheatstone bridge circuit 12 opposite to the vertices thereof which are connected to the secondary winding 24 of the transformer 22. Plate potential for the thermionic amplifier tube 13 is supplied from the line conductors 5 and 6.

A transformer 30 is provided for coupling the thermionic amplifier tube 13 to the phase detector tube 14. The phase detector tube 14 comprises an anode 31, a grid element 32 and a cathode 33. Plate potential for the phase detector tube is supplied by the secondary winding 25 of the transformer 22 as before set forth.

A transformer 34 is provided for coupling the output circuit of the phase detector tube 14 to the input circuit of the detector tube 15. The detector tube 15 comprises an anode 35, a grid element 36 and a cathode 37. Plate potential for the detector tube 15 is supplied from the high voltage armature winding of the motor 1 in series with the regulating field winding 3. Heating current for the filaments of the tubes 13, 14 and 15 is supplied from the line conductors 5 and 6 in series with resistance elements 39, 40 and 41. The circuit through the filaments of the tubes may be traced from the line conductor 5 through the filament 33, filament 37, resistance elements 41 and 40, filament 28 and the resistance element 39 to the negative line conductor 6. The potential drop across the resistance element 39 provides a negative bias for the grid 27 of the amplifier tube 13. The grid bias for the phase detector tube 14 is provided by the potential drop across the filament 37 of the detector tube 15. The potential drop across the resistance element 41 supplies a negative grid bias for the detector tube 15.

A transformer 42 having a primary winding 43 in series with the motor armature circuit and a secondary winding 44 connected to the grid of the phase detector tube 14 is provided for impressing a potential on the phase detector grid which varies in accordance with the rate of change of the motor armature current. The potential impressed on the grid of the phase detector tube serves to stabilize the regulating operation and to prevent hunting action. A resistance element 45 and capacity element 46 are provided in the circuit between the transformer 42 of the grid of the phase detector tube for removing any high frequency currents in the transformer secondary winding which may be caused by the commutator ripple and for adjusting the phase of the transformer output to a suitable value.

An inductance element 47 and a capacity element 48 are provided in the input circuit of the phase detector tube 14 for the double purpose of filtering out harmonics of the frequency supplied to the thermionic amplifier tube 13 and of changing the phase of the output from the amplifier tube 13 so that at frequencies above the tuning frequency of the Wheatstone bridge, the grid voltage of the phase detector tube 14 is in phase with the alternating potential impressed on the plate of the phase detector tube. When a potential having a frequency below the tuning frequency of the Wheatstone bridge circuit is impressed on the grid of the phase detector tube 14, the inductance element 47 and capacity element 48 are so proportioned as to insure the grid potential being substantially 180° out of phase with respect to the plate potential. A condenser 49 is connected across the regulating field winding 3 for by-passing the ripples in the current supplied thereto.

Referring to Figs. 2, 3 and 4 of the drawing, the operation of the system in maintaining the speed of the motor constant will be described. Fig. 2 shows a curve illustrating a characteristic of the output from the Wheatstone bridge circuit 12 which is supplied to the thermionic amplifier tube 13. The abscissa represents the frequency of the current and the ordinates represent the potential impressed on the grid of the thermionic amplifier tube 13. It will be noted that at the tuning point for the Wheatstone bridge circuit the potential in the output circuit thereof is shifted 180° in phase.

In Fig. 3 of the drawing a curve illustrates a characteristic of the output from the thermionic amplifier tube 13 which is supplied to the phase detector tube 14. The amplifier tube 13 increases the ordinates of the waves passing through it at all points except for the limited output therof. Thus as shown in Fig. 3 of the drawing, a slope of the tuning curve in the region of the tuning point for the Wheatstone bridge circuit is greatly increased. In Fig. 3 it may be noted that the potential impressed on the grid of the phase detector tube beyond the tuning point is in phase with the potential impressed on the plate of the detector tube. Before the tuning point is reached the potential impressed on the grid of the phase detector tube is 180° out of phase with the potential impressed on the plate of the phase detector tube.

In Fig. 4 of the drawing, a characteristic of the output from the detector tube 15 is shown. This curve is plotted with frequency of the generator 8 for abscissa and current in the output of the detector tube 15 for ordinates. The average regulating current impressed on the regulating field winding 3 is indicated on the curve.

Assuming the motor 1 is connected across the supply conductors 5 and 6 and is accelerated from zero speed, the alternating current generator 8 will build up a voltage in the output circuit of the amplifier tube 13 as indicated in Fig. 3. Until the frequency of the current produced by the generator 8 approaches the tuning point of the Wheatstone bridge circuit 12, the voltage impressed on the grid of the phase detector tube 14 from the amplifier tube 13 is in a direction to oppose the plate potential in the phase detector tube. When the frequency of the generator approaches the tuning frequency of the Wheatstone bridge circuit, the voltage from the amplifier 13 is reduced and permits the plate current in the phase detector tube 14 to increase until the frequency at which the bridge circuit is tuned is reached. This causes a strengthening of the motor field excitation to limit further increase in the motor speed. When the generator 8 produces a frequency beyond the tuning frequency of the Wheatstone bridge circuit, the output from the thermionic amplifier 13 increases in such phase relation to the potential on the phase detector plate as to increase the current in the phase detector tube 14 and the detector tube 15 to provide further increase in the motor field excitation. In normal operation the motor field current varies small amounts about the average value of current corresponding to the tuning point of the Wheatstone bridge circuit as shown in Fig. 4 of the drawing.

The transformer 42 having the primary winding 43 thereof in the motor armature circuit and the secondary winding 44 thereof connected to the grid of the phase detector tube 14, stabilizes the regulator operation and prevents hunting action as before mentioned. A change in the motor speed occurs without instantaneous adjustment of the excitation of the regulating field winding 3. A large transient current is produced in the armature circuit, however, on any change in the motor speed. The voltage produced by this transient current in the armature circuit is stepped up by the transformer 42 and applied to the grid 32 of the phase detector tube 14. The acceleration of the regulating action is effected in such manner as to stabilize the regulating operation and prevent the so-called hunting action.

Modifications in the system and in the arrangement and location of parts may be made within the spirit and scope of the invention and such modifications are intended to be covered by the appended claims.

What is claimed is:

1. In a regulator system, a dynamo-electric machine having an armature and a field winding, control means comprising a space discharge device for varying the excitation of said field winding according to a characteristic of said machine to maintain the machine characteristic constant, and means controlled by the machine armature current for varying the operation of said device to prevent hunting action.

2. In a speed regulator system, a motor having an armature and a field winding, control means comprising a space discharge device for varying the excitation of said field winding according to the motor speed to maintain the motor speed constant, and feed back means controlled according to the rate of change of the motor armature current for varying the operation of said device to prevent hunting action.

3. In a regulator system, a dynamo-electric machine having an armature and a field winding, a source of alternating current having a frequency varying according to a characteristic of said machine, means comprising a three element thermionic vacuum tube for controlling the machine excitation according to the frequency of said alternating current to maintain the machine characteristic constant, and a feed back circuit from the armature circuit of the machine to the grid of said tube for stabilizing the regulating action.

4. In a speed regulator system, a motor, a source of alternating current having a frequency varying according to the motor speed, means comprising a three element thermionic vacuum tube for controlling the motor field excitation according to the frequency of said alternating current to maintain the motor speed constant, and a feed back circuit from the armature circuit of the motor to the grid of said tube for preventing hunting action.

5. In a regulator system, a motor, a main supply circuit for said motor, control means comprising a three element thermionic vacuum tube for governing said motor to maintain the speed thereof constant, and means for impressing a potential from the motor circuit on the grid of said vacuum tube according to the rate of change of the current supplied to the motor for preventing hunting action.

6. In a regulator system, a dynamo-electric machine, means comprising a three-element thermionic tube responsive to changes in a characteristic of said machine for maintaining the machine characteristic substantially constant, and means for impressing on the grid of said tube a potential varying with changes in the machine current.

7. In a regulator system, a motor, means comprising a thermionic vacuum tube responsive to changes in the speed of the motor for maintaining the motor speed constant, and means for impressing on the grid of said tube a potential varying according to the rate of change of the current supplied to the motor.

8. In a regulator system, a motor having an armature and a field winding, control means comprising a three-element thermionic vacuum tube for varying the excitation of said field winding according to the motor speed to maintain the motor speed constant, and means for impressing a potential from the armature circuit on the grid of said vacuum tube according to the rate of change of the armature current for preventing hunting action.

9. In a speed regulator system, a motor having an armature and a field winding, a source of alternating current having a frequency varying according to the motor speed, means comprising a three-element thermionic vacuum tube for controlling the excitation of said field winding according to the motor speed to maintain the motor speed constant, and an inductive connection between the motor armature circuit and the grid of said vacuum tube for controlling the system to prevent hunting.

10. In a regulator system, a dynamo-electric machine having an armature and a field winding, means comprising a three-element thermionic vacuum tube controlled according to a characteristic of said machine for governing the field excitation to maintain said characteristic constant, and an inductive connection between the motor armature circuit and the grid of said vacuum tube for controlling the system to prevent hunting action.

11. In a speed regulator system, a motor having an armature and a field winding, a source of alternating current having a frequency varying according to the speed of said motor, a Wheatstone bridge circuit having one arm in the form of a tuned circuit, said bridge circuit serving to vary the phase of the output voltage with respect to the voltage of said source according to the frequency of the current from said source, a three-element phase detector tube connected to the output circuit of said said bridge and having plate current supplied by said source, means for varying the current through said field winding according to the output from said phase detector tube, and means for impressing a potential on the grid of the phase detector tube from the armature circuit to prevent hunting action.

12. In a speed regulator system, a motor having an armature and a field winding, a source of alternating current having a frequency varying according to the speed of the motor, a Wheatstone bridge circuit having one arm tuned to the frequency of said source when the motor is operating at normal speed, said bridge circuit serving to control the phase of the output voltage with respect to the voltage of said source according to the frequency of the current from said source, a three-element phase detector tube, an amplifier and a phase shifter for connecting said bridge to the input of said phase detector tube, said phase detector tube being supplied with alternating plate current from said source, a detector tube supplying rectified current from said phase detector tube to said field winding for controlling the motor excitation to maintain the motor speed constant, and a feed back circuit from the motor armature circuit to the grid of said phase detector tube to stabilize the system.

In witness whereof, I hereunto subscribe my name this 16th day of February, 1929.

EDMUND R. MORTON.